United States Patent Office 2,839,570
Patented June 17, 1958

2,839,570

PROCESS FOR THE PRODUCTION OF 1-ACYLOXY-2-METHYL-3-PHYTYL-4-HYDROXY NAPHTHALENES

Herbert Lindlar, Basel, Switzerland, assignor to Hoffmann-La Roche Inc., Nutley, N. J., a corporation of New Jersey No Drawing. Application August 5, 1954
Serial No. 448,154

Claims priority, application Switzerland August 12, 1953

12 Claims. (Cl. 260—476)

The present invention relates to the preparation of new condensation products having a vitamin $K_1$-like activity. According to the present invention the said condensation products are prepared by a process which comprises condensing 2-methyl-1:4-naphthohydroquinone monoesters with phytol, isophytol, or derivatives thereof in the presence of acidic condensing agents, preferably in an ether, formic acid, or glacial acetic acid.

The 2-methyl-1:4-naphthohydroquinone monoesters used as starting compounds may be obtained from the known 2-methyl-1:4-naphthohydroquinone by di-acylation and partial saponification with elimination of one acyl group. Considering the mode of their preparation, the following structural formula can be established for these 2-methyl-1:4-naphthohydroquinone esters:

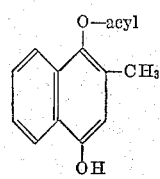

By way of example the preparation of 2-methyl-1:4-naphthohydroquinone monobenzoate of M. P. 171° C. will be described hereinafter.

100 parts by weight of 2-methyl-1:4-naphthohydroquinone are suspended in 900 parts by volume of ether and 400 parts by volume of pyridine are added to the suspension. Then 270 parts by volume of benzoyl chloride are added dropwise at such a rate that the reaction mixture is gently boiling. Thereafter, the reaction mixture is boiled under reflux for a further four hours and then allowed to stand over night. Then the pyridine is removed from the ethereal solution by washing first with water and finally with dilute sulfuric acid. The 2-methyl-1:4-naphthohydroquinone dibenzoate which is formed begins to crystallize. After having allowed the ethereal solution to stand over night at 0° C., 180 parts by weight of 2-methyl-1:4-naphthohydroquinone dibenzoate are recovered.

100 parts by weight of 2-methyl-1:4-naphthohydroquinone dibenzoate are suspended with stirring in 1000 parts by volume of ethanol and then 120 parts by volume of 10% aqueous sodium hydroxide solution are added dropwise to the suspension within 2 hours. Stirring is continued for three hours and after some undissolved material has been filtered off by suction the reaction product is precipitated by adding 5000 parts by volume of water. After filtration by suction, washing and recrystallization from benzene 40 parts by weight of 2-methyl-1:4-naphthohydroquinone monobenzoate melting at 171° C. are obtained.

According to the present invention the 2-methyl-1:4-naphthohydroquinone monoester is condensed with phytol, isophytol, or a derivative thereof. Preferably, 2-methyl-1:4-naphthohydroquinone monobenzoate is used as the starting material as the condensation product obtained therewith is a crystalline substance and can, therefore, easily be purified. Acidic condensing agents such as zinc chloride. sulfuric acid, trichloracetic acid, acetic acid, or oxalic acid, are used for this condensation. Sulfuric acid in small amounts, formic acid in large amounts and boron trifluoride are particularly effective, the latter especially in the form of its ether adduct. Solvents which are conveniently used are open-chained or cyclic ethers such as isopropyl ether, ethyl ether, butyl ether, dioxane and the like. If the ether adduct of boron trifluoride is used as condensing agent, the best advantageous range of temperatures at which the condensation is to be carried out is comprised between 50 and 100° C.

The properties and the mode of preparation of the new condensation products according to the present invention permit the conclusion that the said products are 2-methyl-3-phytyl-1:4-naphthohydroquinone monoesters which can be represented by the following structural formula:

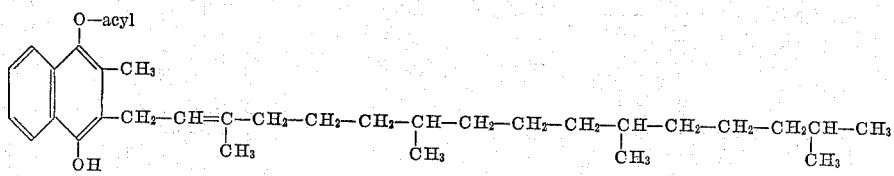

These 2-methyl-3-phytyl-1:4-naphthohydroquinone monoesters possess the same activity as vitamin $K_1$ and can, therefore, be used as medicaments. 2-methyl-3-phytyl-1:4-naphthohydroquinone monobenzoate in which the benzoyl radical is probably attached to the hydroxy group in position 1 is a crystalline substance melting at 77° C.

The present invention is further illustrated, but not limited by the following examples.

Example 1

50 parts by weight of 2-methyl-1:4-naphthohydroquinone monobenzoate melting at 171° C. are suspended in 500 parts by volume of dibutyl ether, and 7 parts by volume of boron trifluoride-ether adduct are added to the suspension which is then heated to 85° C. 30 parts by weight of isophytol are added dropwise, while stirring, within 15 minutes. Stirring is continued for 10 minutes at 85° C., whereupon the reaction mixture is cooled, washed with dilute sodium bicarbonate solution and concentrated in vacuo. The residue is taken up in 500 parts by volume of petroleum ether and allowed to stand over night at 0° C. The product is then filtered off by suction and again washed. Unchanged 2-methyl-1:4-naphthohydroquinone monobenzoate remains on the suction filter. The petroleum ether is removed by distillation and the residue is recrystallized from 100 parts by volume of a 1:1 mixture of methanol and ethanol at —20° C. In this manner 40 to 45 parts by weight of 2-methyl-3-phytyl-1:4-naphthohydroquinone monobenzoate are obtained. After a further recrystallization this compound melts at 77° C.

Example 2

The process is carried out in the same manner as in Example 1, except that instead of isophytol the same amount of phytol is used.

Example 3

The process is carried out in the same manner as in Example 1, except that instead of isophytol 32 parts by weight of phytyl methyl ether are used.

Example 4

The process is carried out in the same manner as in Example 1, except that instead of isophytol 34 parts by weight of phytyl acetate are used.

Example 5

10 parts by weight of 2-methyl-1:4-naphthohydroquinone monobenzoate melting at 171° C. are suspended in 200 parts by volume of formic acid. Then 5 parts by weight of isophytol are added dropwise at 20° C. within 15 minutes. The mixture is stirred for 5½ hours at 20° C. and then concentrated in vacuo. The residue is taken up in petroleum ether and allowed to stand for about 2 hours at 0° C. After filtering by suction and drying, 6.25 parts by weight of 2-methyl-1:4-napthohydroquinone mono-benzoate are recovered. The petroleum ether solution is again concentrated and the residue is recrystallized from 16 parts by volume of ethanol. In this manner 4 parts by weight of 2-methyl-3-phytyl-1:4-naphthohydroquinone monobenzoate are obtained.

Example 6

The process is carried out in the same manner as in Example 1, except that instead of dibutyl ether 300 parts by volume of acetic acid are used as solvent.

Example 7

2 parts by weight of 2-methyl-1:4-naphthohydroquinone monobenzoate melting at 171° C. are dissolved in 20 parts by volume of dioxane and 0.3 part by volume of a mixture of dioxane and sulfuric acid containing, in 100 parts by volume, 33 parts by weight of sulfuric acid is added to the suspension. Then the mixture is heated to 50° C. 2.15 parts by weight of isophytol are added dropwise and thereafter the mixture is heated for a further hour at 50° C. After cooling water is added, the organic portion is taken up in ether, the ethereal solution is washed with sodium bicarbonate solution and concentrated. Petroleum ether is added to the residue and the mixture is cooled to 0° C. for two hours. The precipitated 2-methyl-1:4-naphthohydroquinone monobenzoate is filtered off by suction, the filtrate is evaporated and the residue is cooled to —20° C. in a 1:1 mixture of methanol and ethanol. The formed 2-methyl-3-phytyl-1:4-naphthohydroquinone monobenzoate crystallizes out and is separated.

Example 8

50 parts by weight of 2-methyl-1:4-naphthohydroquinone monoacetate are condensed with 30 parts by weight of isophytol and the excess of starting material is removed as described in Example 1.

After removing the petroleum ether by distillation 50 parts by weight of a syrup consisting of about 80% 2-methyl - 3 - phytyl - 1:4 - naphthohydroquinone monoacetate are obtained.

What we claim is:

1. A process for the production of 1-acyloxy-2-methyl-3-phytyl-4-hydroxy naphthalenes which comprises condensing a 1-acyloxy-2-methyl-4-hydroxy naphthalene with a member of the group consisting of phytol, isophytol, ethers of said compounds and esters of said compounds, in the presence of an acidic condensing agent.

2. A process as in claim 1 wherein 1-benzoyloxy-2-methyl-4-hydroxy naphthalene is used as a starting compound.

3. A process as in claim 1 wherein 1-acetoxy-2-methyl-4-hydroxy naphthalene is used as a starting compound.

4. A process as in claim 1 wherein isophytol is used as a starting compound.

5. A process as in claim 1 wherein phytyl acetate is used as a starting compound.

6. A process as in claim 1 wherein phytyl ether is used as a starting compound.

7. A process as in claim 1 wherein a member of the group consisting of boron trifluoride and boron trifluoride-ether adduct is the acid condensing agent and the reaction is effected within the range 50° to 100° C.

8. A process which comprises condensing 1-benzoyloxy-2-methyl-4-hydroxy naphthalene with isophytol in an ether solvent in the presence of boron trifluoride-ether adduct within the range 50° to 100° C. to produce 1-benzoyloxy-2-methyl-3-phytyl-4-hydroxy naphthalene.

9. A process which comprises reacting 2-methyl-1,4-naphthohydroquinone with an acyl halide to obtain 1,4-diacyloxy-2-methyl naphthalene, saponifying the last named compound with sodium hydroxide to obtain 1-acyloxy-2-methyl-4-hydroxy naphthalene, and condensing said 1-acyloxy-2-methyl-4-hydroxy naphthalene with a phytol compound in the presence of an acidic condensing agent to produce 1-acyloxy-2-methyl-3-phytyl-4-hydroxy naphthalene.

10. The process for the production of 1-acyloxy-2-methyl-3-phytyl-4-hydroxynaphthalene which comprises condensing 1 - acyloxy - 2 - methyl - 4 - hydroxynaphthalene with phytol in the presence of boron trifluoride.

11. The process for the production of 1-acetoxy-2-methyl-3-phytyl-4-hydroxynaphthalene which comprises condensing 1 - acetoxy - 2 - methyl - 4 - hydroxynaphthalene with phytol in the presence of boron trifluoride.

12. The process for the production of 1-benzoyloxy-2-methyl-3-phytyl - 4 - hydroxynaphthalene which comprises condensing 1-benzoyloxy-2-methyl-4-hydroxynaphthalene with phytol in the presence of boron trifluoride.

References Cited in the file of this patent

UNITED STATES PATENTS

| | | |
|---|---|---|
| 2,030,423 | Austin | Feb. 11, 1936 |
| 2,146,007 | Bousquet | Feb. 7, 1939 |
| 2,325,681 | Isler | Aug. 3, 1943 |
| 2,456,686 | Doisy et al. | Dec. 21, 1948 |
| 2,470,902 | Rosenwald | May 24, 1949 |
| 2,683,176 | Isler et al. | July 6, 1954 |